Dec. 18, 1934.  E. BUGATTI  1,985,144

ELASTIC WHEEL FOR RAILWAY VEHICLES

Filed March 23, 1933  3 Sheets-Sheet 1

Inventor:
Ettore Bugatti
By Mauro & Lewis
Attorneys

Dec. 18, 1934.  E. BUGATTI  1,985,144
ELASTIC WHEEL FOR RAILWAY VEHICLES
Filed March 23, 1933  3 Sheets-Sheet 2
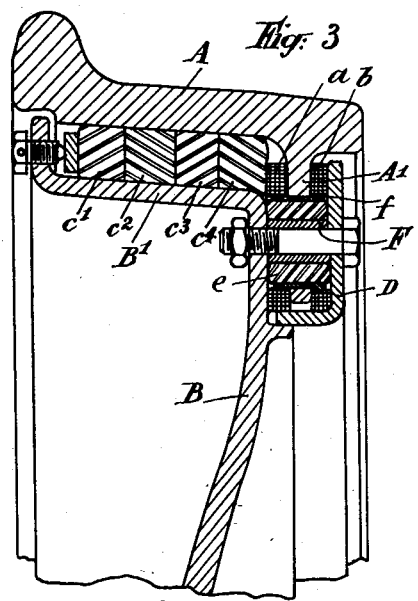
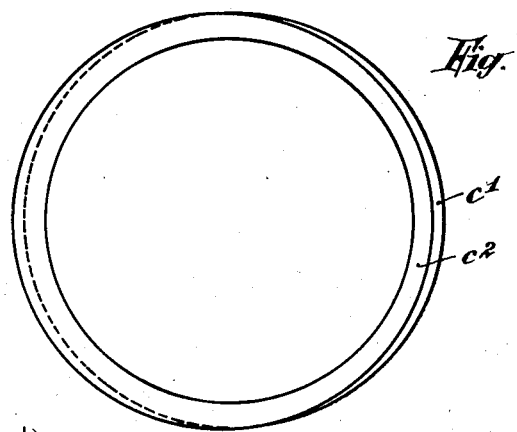
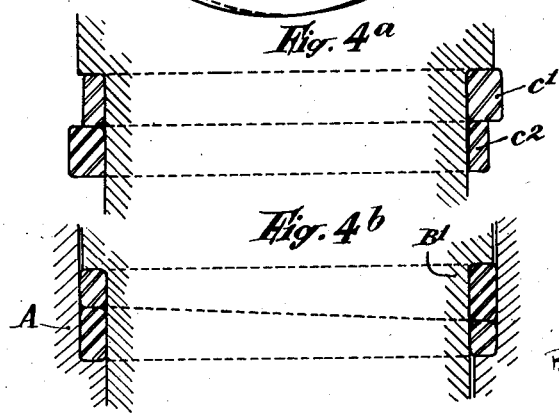

Dec. 18, 1934.  E. BUGATTI  1,985,144
ELASTIC WHEEL FOR RAILWAY VEHICLES
Filed March 23, 1933  3 Sheets-Sheet 3
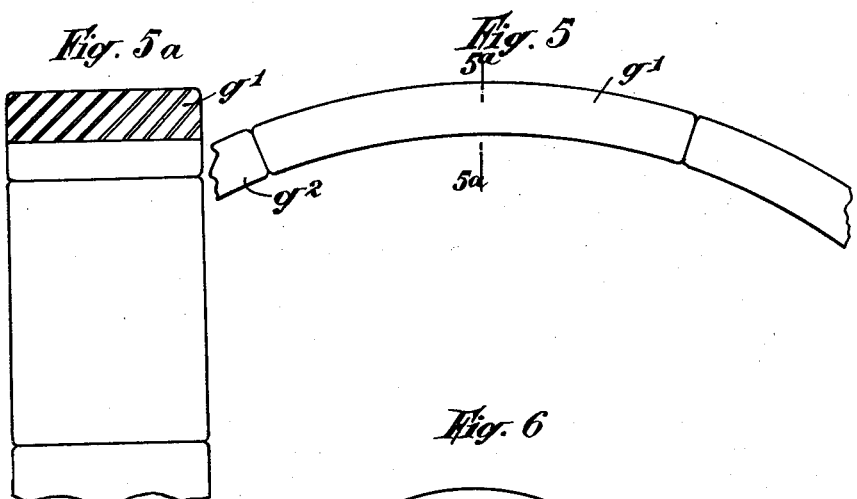
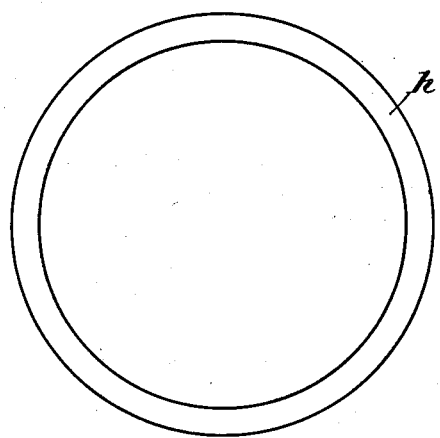
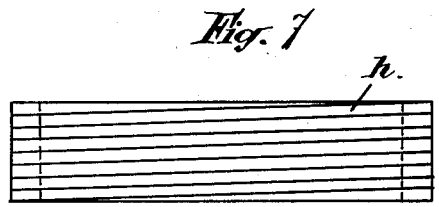

Patented Dec. 18, 1934

1,985,144

UNITED STATES PATENT OFFICE 1,985,144

ELASTIC WHEEL FOR RAILWAY VEHICLES

Ettore Bugatti, Molsheim, France

Application March 23, 1933, Serial No. 662,380
In France March 29, 1932

7 Claims. (Cl. 295—11)

There are wheels for railway vehicles, the metallic tire of which is connected to the central portion of the wheel through an elastic material, for instance wood, fibre, rubber, etc., in order to deaden the vertical shocks due to unevenness of the rails.

Transversal shocks are supported in said wheels by flanges which either are integral with the central portion of the wheel, or come into contact with said portion of the wheel when the axle is moved in a transversal direction. These transversal shocks and the noise produced by the rubbing of the flange against the rail-head are therefore directly transmitted to the central portion of the wheel. It results therefrom that in arrangements of that kind, the rolling portion of the vehicle is very noisy.

In wheels of that type the driving torque and the braking torque are transmitted through the elastic material which is generally connected to the rim and to the tire merely by adhesion.

Another drawback of the wheels of the type above referred to, lies in the lack of means permitting to accurately center the tire with respect to the central portion of the wheel. Such wheels are therefore unbalanced, which is very detrimental to smooth running and safety, especially in the case of vehicles adapted to run at high speed. This want of balance is still further increased by the deformation and the deterioration of the elastic material that is being used (heating).

The object of the present invention is to provide a wheel for railway vehicles which obviates these drawbacks, and the metallic tire of which is fixed to the central portion of the wheel through an elastic material in such manner as to meet the following requirements:

1. Vertical shocks and vibrations are deadened;
2. Horizontal (transversal) shocks and vibrations are deadened;
3. The tire is elastically but positively driven by the central portion of the wheel in the case of driving wheels, or inversely, the central portion is driven in the same way by the tire during the braking period;
4. The tire is accurately and easily centered with respect to the central portion of the wheel in order to obtain well balanced complete wheels;
5. Sufficient safety is ensured in case of deterioration of the elastic material;
6. The tire together with its flange and the elastic material can be easily and rapidly replaced, said parts being the only ones that are liable to wear and tear;
7. A good protection against the noise produced by the running of the tire on the rail, and the rubbing of the flange against the rail-head, is obtained.

The essential feature of the wheel according to my invention, consists in that the tire is provided with an inwardly projecting rib eventually divided into a plurality of sections, and which is held between two cheeks integral with, or rigidly fixed to, the central portion of the wheel, elastic fittings being interposed between said cheeks and said rib.

The tire and the central portion of the wheel are positively connected together, for instance by means of bolts, but with the interposition of elastic sleeves.

In an embodiment of my invention, one of the fittings provided between the rib and one of the cheeks, for instance, the cheek that is in line with the web of the wheel, comprises projecting parts provided with holes for the bolts that connect the web of the wheel to the rib, said projections engaging into suitable holes provided in said rib so as to form the elastic sleeves above referred to.

Furthermore, the tire rests on the rim, which may for instance consist of a flange of the web, through an elastic ring eventually divided into a plurality of portions, and which may be more or less compressed by means of a circle or of lateral segments, controlled by suitable means.

The relative displacements of the tire and of the central portion of the wheel, in case of deterioration of the elastic material, are limited by suitable stops.

It should be noted that the elastic elements that go to form the wheel above described, have to perform three different functions:

1. To support the radial load;
2. To withstand the axial stresses;
3. To cooperate in driving the wheel.

These considerations have led me to provide another embodiment of my invention, in which the various elastic elements are made of materials having different properties so as to take into account the kind of work they have got to do. For instance, I may use rubber of varying hardnesses, a rubber more or less reinforced, or substances of different kinds such as rubber for the radial load and for the driving, and fibre for the axial thrusts.

On the other hand, it should be noted that the accurate centering of the tire with respect to the central portion of the wheel, which is necessary if high speeds of revolution are to be reached, depends on the elastic ring interposed between the inner surface of the tire and the corresponding flange of the central portion of the wheel, or of the cheeks that are integral therewith.

Now, the difficulty of producing accurately balanced and well centered vehicle wheels is known to those skilled in the art. It results in particular from the lack of homogeneity of the elastic material that is used. In order to obviate this drawback, according to another embodiment of my invention, the elastic ring above referred to is made of several similar or equal parts. Thus, I may form the ring either of several juxtaposed annular portions, or of several segments placed end to end, or again of a band wound so as to form contacting or non-contacting turns.

Owing to that division of the ring into a plurality of parts, it is possible for the manufacturer, by suitably distributing said parts, to compensate for inequalities resulting from differences in the manufacture.

Preferred embodiments of my invention will be hereinafter described with reference to the accompanying drawings given merely by way of example, and in which:

Fig. 3 is a view similar to Fig. 1 showing another embodiment of my invention;

Fig. 4 is an elevational view of an elastic ring consisting of two annular elements of defective shape.

Figs. 4a and 4b are diametrical sectional views of said annular elements respectively before and after their being compressed between the elements of the wheel that surround them;

Fig. 5 is an elevational view of a portion of an elastic ring made of several parts;

Fig. 5a is a sectional view on the line 5a—5a of Fig. 5;

Fig. 6 is an elevational view of another type of elastic ring;

Fig. 7 is a sectional view of the ring of Fig. 6.

Figure 1:
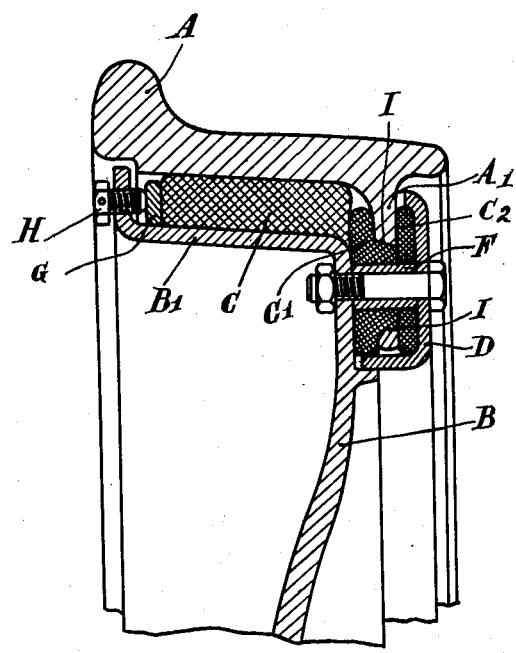
Fig. 1 is an axial section view on the line 1—1 of Fig. 2.

As shown in the embodiment of Fig. 1, the metallic tire A is provided with an inwardly projecting rib A1. Said rib is provided from place to place with holes I. Of course, the rib is not necessarily continuous. In said holes I are engaged bolts E which serve to connect the web B of the wheel and the annular fixation cheek D together. Said bolts are surrounded with bracing members F. Rib A1 is held between fittings C1 and C2. Fitting C1 may be provided with projections which engage into holes I, and act as elastic sleeves interposed between the edges of said holes and braces F. Tire A rests on rim B1 through an elastic ring C, eventually slit or even divided into several portions. Said ring is applied on the one hand against fittings C1, and on the other hand against a circle or lateral segments G, the positions of which are determined through bolts H, or equivalent means. Of course, elastic organs C, C1, C2 are made of any suitable material; organs C and C1 may be made in a single unit, being for instance moulded.

It will be noted that just the necessary clearance space is provided between tire A and web B on the one hand, and between rib A1 and the horizontal edge of cheek D on the other hand, in order that in case of the elastic organs getting deteriorated, the collapse of the wheel may be limited.

It should be well understood that details of the embodiments above described could be modified without departing from the principle of my invention. For instance in order to facilitate the centering and the balancing of the wheel, which are modified by acting on bolts H and E, a set of bracing members F of different lengths can be utilized.

Figure 2:
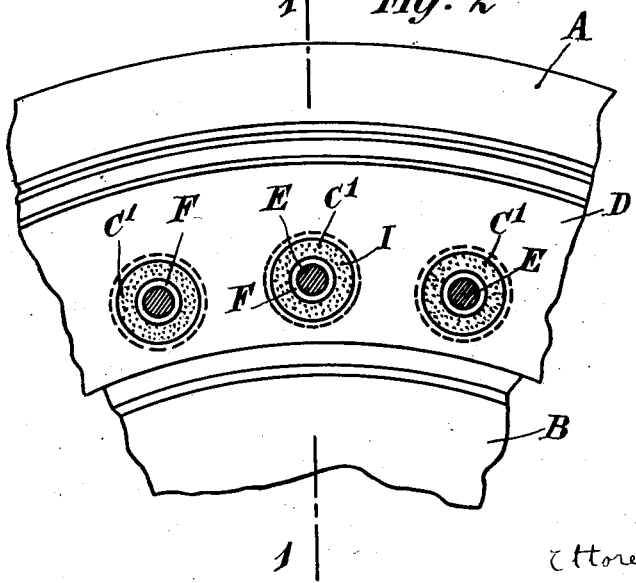
Fig. 2 is an elevational view of a portion of the wheel according to my invention.

In the embodiment shown in Fig. 3, the elastic ring which was designated by reference letter C in Figs 1 and 2, is now formed by a plurality of juxtaposed rubber rings $c_1$, $c_2$, $c_3$, $c_4$. On either side of rib A1 are provided two annular members $a$ and $b$ which are interposed between said rib and web B and cheek D respectively. Said annular members $a$ and $b$ are made for instance of fibre or india-rubber of a quality different from those of rings $c_1$, $c_2$, etc., or of any other suitable elastic material. The parts drive one another through rubber rings $e$ inserted between metallic braces F and supplementary sleeves $f$ of smaller length than braces F, so as to permit rings $a$ and $b$ to perform the function for which they are intended.

It is possible that inequalities appear between the elements $c_1$, $c_2$, etc., that go to form elastic ring $c$ in the course of their manufacture. In this case they are compensated by effecting the mounting of the ring in a manner which will be described with reference to Figs. 4, 4a and 4b.

For the sake of clearness, I will consider only two rings $c_1$ and $c_2$, and I will suppose that due to their defective moulding the walls of the rings are limited by two cylinders which are not coaxial. Rings $c_1$ and $c_2$ are disposed on member $b$ so that they are turned by 180° (or more generally $$\frac{360°}{n}$$

when $n$ rings are utilized) with reference to one another. Tire A is now placed in position and the rings are compressed as shown in Fig. 4b, so that the inequalities are compensated.

The elastic ring may also be divided into a plurality of segments such as $g_1$, $g_2$, etc., in Figs. 5 and 5a. But in this case the compensation of the inequalities in order to produce a good centering is obtained by suitably interchanging said segments. Of course this division into segments might be employed to a greater or less degree with a ring already divided into a plurality of annular elements.

As shown in Figs. 6 and 7, the ring could be obtained from a band of rubber $b$, wound around member B in contacting or non-contacting turns.

It should also be understood that the elastic organs could be interposed between the hub and the rim, or between the hub and a ring intermediate between said hub and said rim.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. A wheel especially adapted for railway vehicles which comprises in combination, a web, a cylindrical projection coaxially provided on the outer face of said web, an annular cheek, a cylindrical flange on said cheek adapted to fit on said projection so as to form an outwardly opening channel running along the periphery of said web means for rigidly fixing said cheek opposite the marginal portion of said web in substantially parallel relation thereto and at a given distance therefrom, a metallic tire, an inwardly projecting rib on the inner face of said tire engaged between said marginal portion of the web and said cheek, said marginal portion of the web, said rib, and said cheek being provided with a plurality of registering holes, a plurality of rigid members extending throughout said holes for angularly connecting said tire to said web, elastic means on either side of said rib for holding it wedged between said marginal portion of the web and said cheek, a rim on the periphery of said web, and an elastic ring distinct and separate from said elastic means interposed between said rim and said tire.

2. A wheel especially adapted for railway vehicles which comprises in combination, a web, a cylindrical projection coaxially provided on the outer face of said web, an annular cheek, a cylindrical flange on said cheek adapted to fit on said projection so as to form an outwardly opening channel running along the periphery of said web means for rigidly fixing said cheek opposite the marginal portion of said web in substantially parallel relation thereto and at a given distance therefrom, a metallic tire, an inwardly projecting rib on the inner face of said tire engaged between said marginal portion of the web and said cheek, said marginal portion of the web, said rib, and said cheek being provided with a plurality of registering holes, a plurality of rigid members extending throughout said holes for angularly connecting said tire to said web, elastic means on either side of said rib for holding it wedged between said marginal portion of the web and said cheek, elastic sleeves interposed between said rigid members and the edges of the holes provided in the rib, a rim on the periphery of said web, and an elastic ring distinct and separate from said elastic means and sleeves interposed between said rim and said tire.

3. A wheel especially adapted for railway vehicles which comprises in combination, a web, a cylindrical projection coaxially provided on the outer face of said web, an annular cheek located opposite the marginal portion of said wheel in a plane substantially parallel thereto, a cylindrical flange on said cheek adapted to fit on said projection so as to form an outwardly opening channel running along the periphery of said web, a plurality of bracing members interposed between said marginal portion of the web and said cheek, a plurality of bolts rigidly fixing said cheek to said web, a metallic tire, an inwardly projecting rib on the inner face of said tire engaged between said marginal portion of the web and said cheek, said rib being provided with a plurality of holes for said bracing members and said bolts, elastic means on either side of said rib for holding it wedged between said marginal portion of the web and said cheek, a rim on the periphery of said web, and an elastic ring distinct and separate from said elastic means interposed between said rim and said tire.

4. A wheel especially adapted for railway vehicles which comprises in combination, a web, a cylindrical projection coaxially provided on the outer face of said web, an annular cheek located opposite the marginal portion of said web in a plane substantially parallel thereto, a cylindrical flange on said cheek adapted to fit on said projection so as to form an outwardly opening channel running along the periphery of said web, a plurality of tubular bracing members interposed between said marginal portion of the web and said cheek, a plurality of bolts extending through said tubular members for rigidly fixing said cheek to said web, a metallic tire, an inwardly projecting rib on the inner face of said tire engaged between said marginal portion of the web and said cheek, said rib being provided with a plurality of holes for said bracing members and said bolts, rings of a yielding material disposed on either side of said rib for holding it tightly wedged between said marginal portion of the web and said cheek, annular projections on one of said rings adapted to engage between the edges of the holes in the rib and said tubular bracing members respectively, a rim carried by said web, and an elastic cushion distinct and separate from said rings between said rim and said tire.

5. A wheel especially adapted for railway vehicles which comprises in combination, a web, a cylindrical projection coaxially provided on the outer face of said web, an annular cheek, a cylindrical flange on said cheek adapted to fit on said projection so as to form an outwardly opening channel running along the periphery of said web, means for rigidly fixing said cheek opposite the marginal portion of said web in substantially parallel relation thereto and at a given distance therefrom, a metallic tire, an inwardly projecting rib on the inner face of said tire engaged between said marginal portion of the web and said cheek, said marginal portion of the web, said rib and said cheek being provided with a plurality of registering holes, a plurality of rigid members extending throughout said holes for angularly connecting said tire to said web, elastic means on either side of said rib for holding it wedged between said marginal portion of the web and said cheek, elastic sleeves interposed between said rigid members and the edges of the holes provided in the rib, a rim on said web coaxial with said tire, an elastic ring distinct from said elastic means and sleeves interposed between said rim and said tire and bearing through one of its faces against one of said elastic means, at least one circular element slidably mounted on said rim and bearing against the other side of said ring, and means carried by said rim for adjustably pushing said circular member against said ring.

6. A wheel especially adapted for railway vehicles which comprises in combination, a web, a cylindrical projection coaxially provided on the outer face of said web, an annular cheek located opposite the marginal portion of said web in a plane substantially parallel thereto, a cylindrical flange on said cheek adapted to fit on said projection so as to form an outwardly opening channel running along the periphery of said web, a plurality of tubular bracing members interposed between said marginal portion of the web and said cheek, a plurality of bolts extending through said tubular members for rigidly fixing said cheek to said web, a plurality of elastic sleeves surrounding said tubular bracing members respectively, a plurality of metallic sleeves slightly shorter than said bracing members surrounding said elastic sleeves respectively, a metallic tire, an inwardly projecting rib on the inner face of said tire engaged between said marginal portion of the web and said cheek, said rib being provided with a plurality of holes for said metallic sleeve, rings of a yielding material disposed on either side of said rib for holding it tightly wedged between said marginal portion of the web and said cheek, a rim carried by said web, and an elastic cushion distinct from said sleeves and rings between said rim and said tire.

7. A wheel especially adapted for railway vehicles, which comprises in combination, a web, an outwardly opening channel running along the periphery of said web, a metallic tire, an inwardly projecting rib on the inner face of said tire engaged in said channel, said rib and said channel being provided with registering holes, a plurality of rigid members extending in a direction substantially parallel to the axis of the wheel throughout said holes, elastic means on either side of said rib for holding it wedged between the inner faces of said channel, a rim on said web coaxial with said tire, and annular elastic means distinct and separate from the first mentioned elastic means interposed between said rim and said tire.

ETTORE BUGATTI.